United States Patent
Pai et al.

(10) Patent No.: US 9,307,370 B1
(45) Date of Patent: Apr. 5, 2016

(54) METHOD AND APPARATUS FOR ESTABLISHING A GROUP CALL IN A MULTIPLE WIRELESS TECHNOLOGY COMMUNICATION SYSTEM

(71) Applicant: MOTOROLA SOLUTIONS, INC, Schaumburg, IL (US)

(72) Inventors: Madhusudan K. Pai, Schaumburg, IL (US); Vikas Mehrotra, Schaumburg, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/580,937

(22) Filed: Dec. 23, 2014

(51) Int. Cl.
*H04M 11/04* (2006.01)
*H04W 4/10* (2009.01)
*H04W 4/22* (2009.01)

(52) U.S. Cl.
CPC . *H04W 4/10* (2013.01); *H04W 4/22* (2013.01)

(58) Field of Classification Search
CPC ..... H04W 76/007; H04W 4/22; H04M 11/04; H04M 2242/04
USPC ........... 455/404.1, 518, 422.1, 450, 445, 453
See application file for complete search history.

(56) References Cited

U.S. PATENT DOCUMENTS

| | | | |
|---|---|---|---|
| 8,050,700 B2 | 11/2011 | Copeland | |
| 8,494,458 B2 | 7/2013 | Tucker et al. | |
| 2008/0200162 A1 | 8/2008 | Chowdhury et al. | |
| 2013/0115995 A1 | 5/2013 | Miller et al. | |
| 2013/0122811 A1* | 5/2013 | Scribano | H04W 16/14 455/41.2 |
| 2014/0038657 A1* | 2/2014 | Jo | H04W 72/005 455/509 |

FOREIGN PATENT DOCUMENTS

| | | |
|---|---|---|
| EP | 2160050 A1 | 3/2010 |
| WO | 2010039565 A2 | 8/2010 |
| WO | 2013066628 A1 | 5/2013 |

\* cited by examiner

*Primary Examiner* — Nghi H Ly (57) ABSTRACT

A communication system is provided that sets up a group call, originated in a first originating network, in a second originating network when insufficient resources are available in the first originating network, wherein the first originating network is one of a narrowband network and a broadband network and the second originating network is the other network of the narrowband and broadband networks. An infrastructure device of the first originating network receives a first group call request from an originating mobile device and, in response to receiving the request, determines that insufficient resources are available in the first originating network for allocation to the mobile device for the group call. In response to determining that insufficient network resources are available, the infrastructure device arranges to set up an originating leg of the group call for the originating mobile device in the second originating network.

19 Claims, 7 Drawing Sheets

METHOD AND APPARATUS FOR ESTABLISHING A GROUP CALL IN A MULTIPLE WIRELESS TECHNOLOGY COMMUNICATION SYSTEM

FIELD OF THE INVENTION

The present invention relates generally to wireless communication systems and, in particular, to group call services in a Public Safety communication system.

BACKGROUND OF THE INVENTION

When a public safety officer attempts to make a Push-To-Talk (PTT) call using his or her land mobile radio (LMR) and the network, for example, an ASTRO network, serving the officer lacks resources to complete the call, the call may be queued due to a "busy" network (resource unavailability). For example, in an ASTRO communication system, the call may be queued by a Zone Controller. The call later may be granted (for example, by the Zone Controller) when resources become available. However, when such a delay occurs in the set up of a PTT call at an emergency incident, such a delay could endanger the safety of the public safety officer or others involved in the incident.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A communication system is provided that sets up a group call, originated in a first originating network, in a second originating network when insufficient resources are available in the first originating network, wherein the first originating network is one of a narrowband network and a broadband network and the second originating network is the other network of the narrowband and broadband networks. An infrastructure device, such as a Call Controller or a Group Call Server, of the first originating network receives a first group call request from an originating mobile device and, in response to receiving the request, determines that insufficient resources are available in the first originating network for allocation to the mobile device for the group call. In response to determining that insufficient network resources are available, the infrastructure device arranges to set up an originating leg of the group call for the originating mobile device in the second originating network.

Generally, an embodiment of the present invention encompasses a method for implementing a group call, the method comprising receiving, by an infrastructure device associated with a first originating network from a mobile device, a group call request, wherein the first originating network is one of a narrowband network and a broadband network; in response to receiving the group call request, determining, by the infrastructure device, that insufficient network resources are available in the first originating network for allocation to the mobile device for the group call; and in response to determining that insufficient network resources are available, arranging, by the infrastructure device, to set up an originating leg of the group call for the mobile device in a second originating network, wherein the second originating network is the other network of the narrowband network and the broadband network.

Another embodiment of the present invention encompasses an apparatus for implementing a group call in a wireless communication system comprising a narrowband network and a broadband network. The apparatus includes an infrastructure device comprising an interface, a processor; and an at least one memory device. The at least one memory device is configured to store a set of instructions that, when executed by the processor, cause the processor to perform the following functions: receive, via the interface and from a mobile device, a group call request; in response to receiving the group call request, determine that insufficient network resources are available in a first originating network for allocation to the mobile device for the group call, wherein the first originating network is one of the narrowband network and the broadband network; and in response to determining that insufficient network resources are available in the first originating network, arrange to set up an originating leg of the group call for the mobile device in a second originating network, wherein the second originating network is the other network of the of the narrowband network and the broadband network.

Yet another embodiment of the present invention encompasses a system for implementing a group call in a wireless communication system comprising a plurality of narrowband networks and a plurality of broadband networks. The system includes a narrowband network infrastructure device that is configured to: receive, from an originating mobile device, a first group call request that identifies a target mobile device; in response to receiving the first group call request, determine that insufficient resources of a first narrowband network of the plurality of narrowband networks are available for allocation to the mobile device for the group call; and in response to determining that insufficient narrowband network resources are available, convey a second group call request to a broadband Group Call Server. The system further includes one or more broadband Group Call Servers that are configured to: receive the second group call request; establish an originating leg of the group call with the originating mobile device in a first broadband network of the plurality of broadband networks; and establish a terminating leg of the group call with the target mobile device in a second broadband network of the plurality of broadband networks. The narrowband network infrastructure device further is configured to establish a terminating leg of the group call with the target mobile device in a second narrowband network of the plurality of narrowband networks.

Still another embodiment of the present invention encompasses a system for implementing a group call in a wireless communication system comprising a plurality of narrowband networks and a plurality of broadband networks. The system includes one or more broadband Group Call Servers that are configured to: receive, from an originating mobile device, a first group call request that identifies a target mobile device; in response to receiving the first group call request, determine that insufficient resources of a first broadband network of the plurality of broadband networks are available for allocation to the mobile device for the group call; and in response to determining that insufficient broadband network resources are available, convey a second group call request to a narrowband network infrastructure device. The system further includes the narrowband network infrastructure device, wherein the narrowband network infrastructure device is configured to: receive the second group call request; establish an originating leg of the group call with the originating mobile device in a first narrowband network of the plurality of narrowband networks; and establish a terminating leg of the group call with the target mobile device in a second narrowband network of the plurality of narrowband networks. The one or more broadband Group Call Servers further are configured to establish a terminating leg of the group call with the target mobile device in a second broadband network of the plurality of broadband networks.

Figure 1:
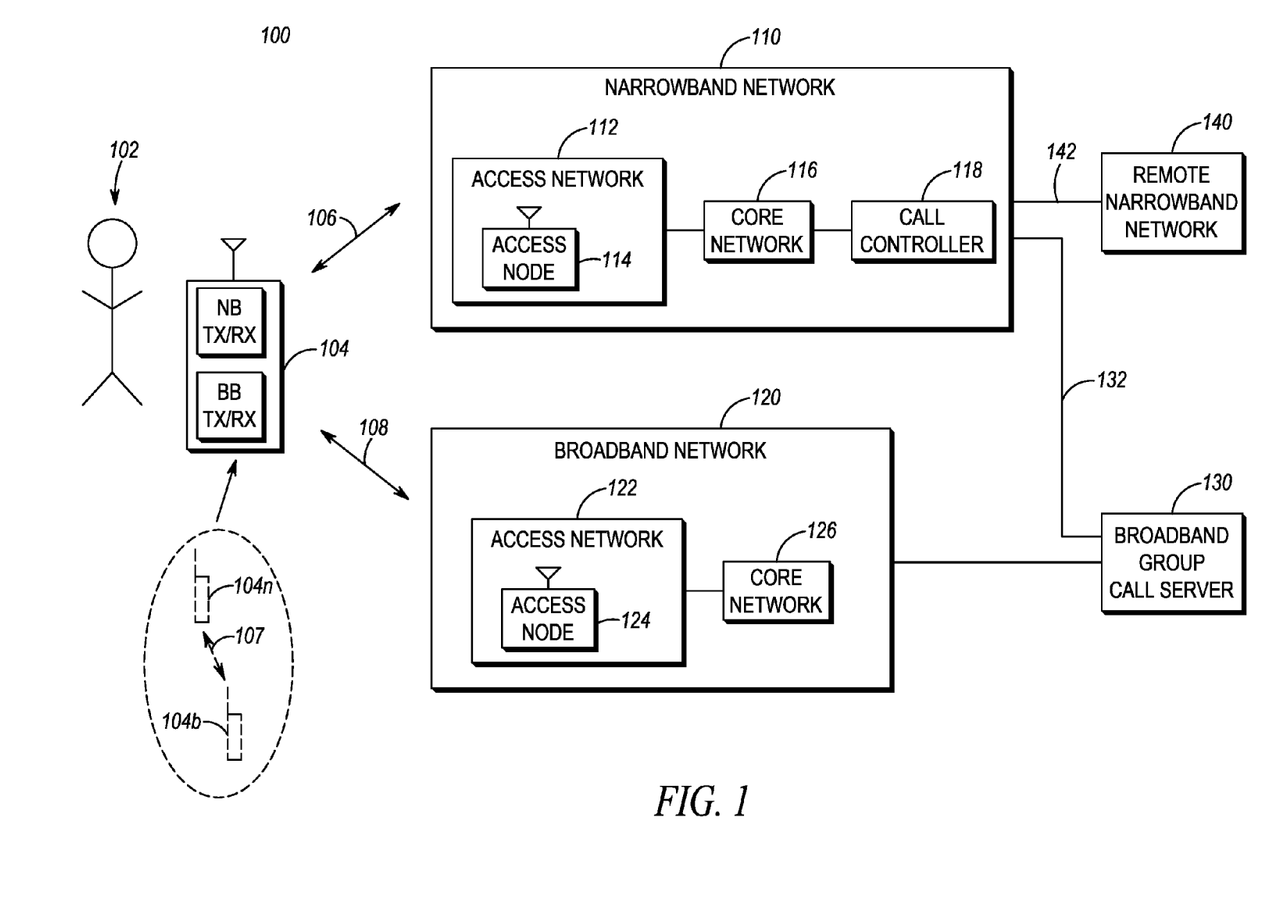
FIG. 1 is a block diagram of a wireless communication system in accordance with various embodiments of the present invention.

The present invention may be more fully described with reference to FIGS. 1-7B. FIG. 1 is a block diagram of a wireless communication system 100 in accordance with various embodiments of the present invention. Communication system 100 includes a narrowband network 110, a broadband network 120, and a remote narrowband network 140. Narrowband network 110 comprises a narrowband access network 112 in communication with a narrowband core network 116, which in turn is in communication with a narrowband Call Controller 118, for example, a Site Controller or a Zone Controller or any other infrastructure device that performs call processing and allocates channels/resources for group calls. Narrowband access network 112 includes a narrowband access node 114 that provides wireless communications services to narrowband mobile devices residing in a coverage area of the narrowband access node via a narrowband air interface 106. Broadband network 120 comprises a broadband access network 122 in communication with a broadband core network 124. Broadband access network 122 includes a broadband access node 124 that provides wireless communications services to broadband mobile devices residing in a coverage area of the broadband access node devices via a broadband air interface 108. Each of air interfaces 106 and 108 includes an uplink and a downlink, which uplinks and downlinks each includes multiple traffic channels and multiple signaling channels.

For example, a public safety organization may use specialized voice communication system that employs a narrowband network that typically support low-bit-rate digital or analog transmission of audio and/or data streams. An example of such a narrowband network is a network used by a Project 25 (P25)-compatible two-way Push-To-Talk voice communication system that includes wireless and wired voice communication devices. Other examples include a Land Mobile Radio (LMR) system or a Terrestrial Trunked Radio (TETRA) system. Public safety organizations may choose these narrowband systems because they provide improved end-to-end voice quality and efficient group communication, use advanced cryptography, enable centralized logging of calls, and/or are associated with lower delay and higher reliability. In parallel, a public safety organization also may use a broadband communication system that employs a broadband network that supports data applications. An example of such a broadband network is a network that operates in accordance with the Long Term Evolution (LTE) signaling standard, wherein the core network is an evolved packet core (EPC). Broadband systems typically support high-bit-rate digital transmission of data streams, including real-time video.

Communication system 100 further includes a mobile device 104 associated with a user 102 and that resides within a coverage area, such as a cell or a sector of a cell, of each of narrowband access node 114 and broadband access node 124 and correspondingly is served by each of narrowband network 110 and broadband network 120. In one embodiment of the present invention, mobile device 104 is a multi-mode communication device comprising a narrowband (NB) transceiver (Tx/Rx), which permits mobile device 104 to engage in communications with narrowband network 110, and a broadband (BB) transceiver, which permits mobile device 104 to engage in communications with broadband network 120. Thus, mobile device 104 may be provided narrowband communication services by narrowband network 110 via access node 114 and air interface 106 and further may be provided broadband communication services by broadband network 120 via access node 124 and air interface 108.

In other embodiments of the present invention, instead of a single multi-mode mobile device 104, broadband and narrowband services may be provided to user 102 via multiple mobile devices, such as narrowband mobile device $104_n$, for example, a portable narrowband two-way radio, a land mobile radio (LMR), or other similar voice communication entity, and a broadband mobile device $104_b$, for example, a wireless communication-enabled laptop, tablet, or personal digital assistant (PDA), a cellular telephone, or other similar communication entity. Although mobile devices $104_n$ and $104_b$ communicate in communication system 100 on different networks, these devices may be "paired" to collaborate so that information sent to, or received from, one of mobile devices $104_n$ or $104_b$ may be based on information sent to, or received from, the other mobile device $104_b$ or $104_n$, respectively. "Pairing" the devices means that the devices are within range of, and can communicate with each other via, a short-range wireless link 107, such as a Bluetooth link or a wireless local area network (WLAN) link. The ability to perform device collaboration between narrowband mobile device $104_n$ and broadband mobile device $104_b$ being used by a single subscriber 102 may enable the subscriber to use either the narrowband mobile device or the broadband mobile device beyond the capabilities offered by such a mobile device. In such a multiple mobile device embodiment, references herein to communications between mobile device 104 and narrowband network 110 shall correspond to communications between mobile device $104_n$ and narrowband network 110, and references herein to communications between mobile device 104 and broadband network 120 shall correspond to communications between mobile device $104_b$ and the broadband network.

Communication system 100 further includes a broadband Group Call Server 130, such as a Push-to-Talk (PTT) Server. Group Call Server 130 is in communication with broadband access node 124 via core network 109, such as an evolved packet core (EPC) in an LTE communication system. Group Call Server 130 further is in communication with narrowband network 110, and in particular Call Controller 118, via a first inter-system interface 132, such as an Inter-RF (Radio Frequency) Subsystem Interface (ISSI). Call Controller 118 also may communicate with remote narrowband network 140 via a second inter-system interface 142.

Group Call Server 130 controls group sessions of a broadband communication group, including managing talkgroups and lists that are needed for provision of broadband service, for example, maintaining identifiers of and contact information for members of a talkgroup. More particularly, Group Call Server 130 provides talkgroup list management functionality to communication system 100, for example, creating, modifying, retrieving and deleting talkgroups, for authorized users, providing storage for talkgroups and lists, and providing notifications to authorized users of modifications to the talkgroups and lists. Each talkgroup includes a talkgroup identifier (ID) that is uniquely associated with the talkgroup and, in association with the talkgroup ID, a list of member identifiers (IDs), such as mobile device IDs, for example, a Subscriber Unit ID (SUID), a Mobile Subscriber ISDN Number (MSISDN) an International Mobile Equipment Identity (IMEI), or an International Mobile Subscriber Identity (IMSI), that uniquely identify each member of the talkgroup.

Access nodes 112 and 122, core networks 114 and 124, Call Controller 118, and Group Call Server 130 collectively comprise an infrastructure of communication system 100 and, correspondingly, each may be referred to as an infrastructure device of communication system 100.

Figure 2:
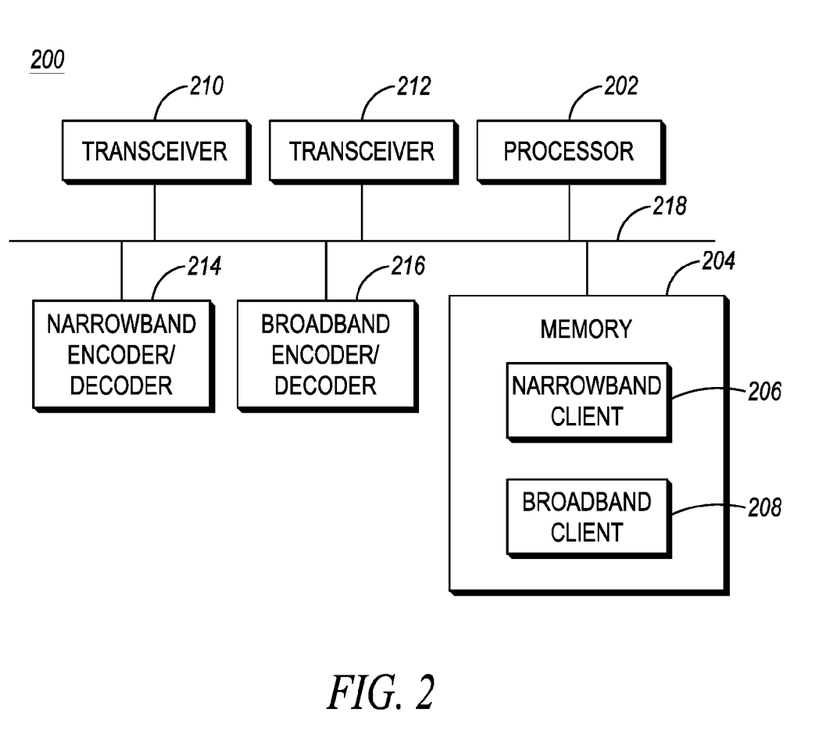
FIG. 2 is a block diagram of a mobile device in accordance with various embodiments of the present invention.

Referring now to FIG. 2, a block diagram of a mobile device 200, such as mobile devices 104, $104_n$, $104_b$, and 602 and 603 (referred to below), is provided in accordance with various embodiments of the present invention. Mobile device 200 includes a processor 202, such as one or more microprocessors, microcontrollers, digital signal processors (DSPs), combinations thereof or such other devices known to those having ordinary skill in the art. Mobile device 200 further includes an at least one memory device 204, such as random access memory (RAM), dynamic random access memory (DRAM), and/or read only memory (ROM) or equivalents thereof, in communication with processor 202 via a bus 218 and that maintains data and programs that may be executed by the processor and that allows the mobile device to perform all functions necessary to operate in communication system 100.

At least one memory device 204 maintains one or more of a narrowband client 206 that, when executed by processor 202, facilitates a peer-to-peer exchange of signaling and traffic with a corresponding narrowband client of Group Call Server 130, and a broadband client 208 that, when executed by processor 202, facilitates a peer-to-peer exchange of signaling and traffic with a corresponding broadband client of Group Call Server 130. For example, in one embodiment, when mobile device 200 is a multi-mode communication device comprising narrowband and broadband modems that permit the mobile device to engage in communications with each of narrowband network 110 and broadband network 120, then mobile device 200 may include both narrowband client 206 and broadband client 208. However, in other embodiments, when mobile device 200 merely is a narrowband mobile device then mobile device may merely include narrowband client 206 and when mobile device 200 merely is a broadband mobile device then mobile device may merely include broadband client 208.

At least one memory device 204 further maintains at least one identifier (ID) of the mobile device, such as a subscriber unit ID (SUID), an IMEI, an MSISDN and/or an IMSI, that is uniquely associated with the mobile device. For example, when mobile device 200 is a multi-mode communication device capable of engaging in communications with each of narrowband network 110 and broadband network 120, then at least one memory device 204 may maintain mobile device IDs associated with each of networks 110 and 120, for example, a narrowband network mobile device ID that may be used to identify the mobile device in narrowband network 110 and a broadband network mobile device ID that may be used to identify the mobile device in broadband network 120. The narrowband network mobile device ID and the broadband network mobile device ID may be the same or different IDs. On the other hand, when mobile device 200 is a narrowband mobile device, such as mobile device $104_n$, then mobile device may include a narrowband network mobile device ID and when mobile device 200 is a broadband mobile device, such as mobile device $104_b$, then mobile device may merely include a broadband network mobile device ID. Further, in such an embodiment, the narrowband mobile device may obtain the broadband network mobile device ID from the broadband mobile device via link 107 and store the broadband network mobile device ID in at least one memory device 204 of the narrowband mobile device, so that the narrowband mobile device may provide the broadband network mobile device ID to narrowband network 110 when needed.

Additionally, at least one memory device 204 may maintain a list of talkgroup IDs that are each uniquely associated with a talkgroup of which the mobile device is a member and which talkgroups may be engaged by the mobile device in a group call. The talkgroup IDs may be preprogrammed into at least one memory device 204 or may be added to the at least one memory device by a user of the mobile device.

Mobile device 200 further includes one or more transceivers 210, 212 (two shown) and one or more encoders/decoders 214, 216 (two shown) that each are coupled, via bus 218, to processor 202. Each of the one or more transceivers 210, 212 includes a radio frequency (RF) receiver and an RF transmitter for communicating with one or more of access nodes 112 and 122. For example, when mobile device 200 is a multi-mode communication device capable of engaging in communications with each of narrowband network 110 and broadband network 120, then the mobile device may include a narrowband transceiver 210 and a narrowband encoder/decoder 214 for exchanging commuincations with narrowband network 110 and a broadband transceiver 212 and a broadband encoder/decoder 216 for exchanging commuincations with broadband network 120. In various embodiments of the present invention, encoders/decoders 214 and 216 may be implemented by processor 202, may be respectively implemented by transceivers 210 and 212, or may be separate elements of the mobile device.

Figure 3:
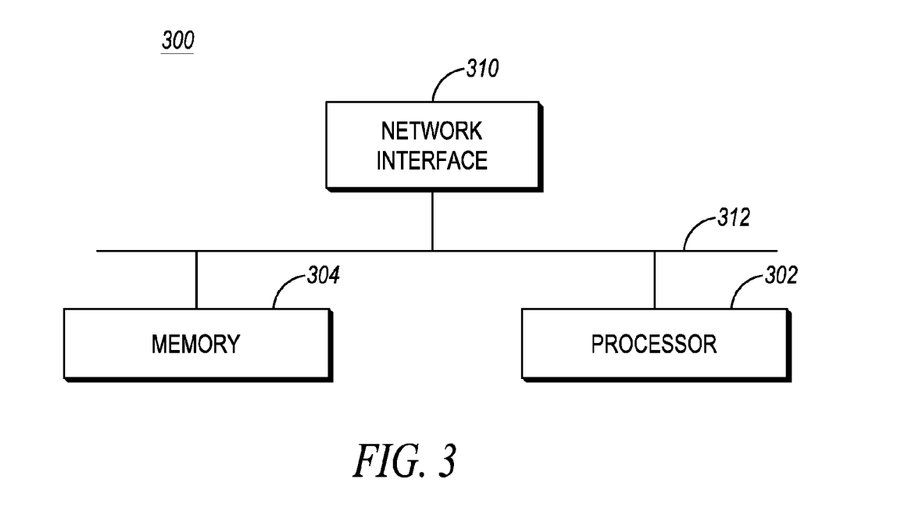
FIG. 3 is a block diagram of a Call Controller in accordance with an embodiment of the present invention.
Figure 4:
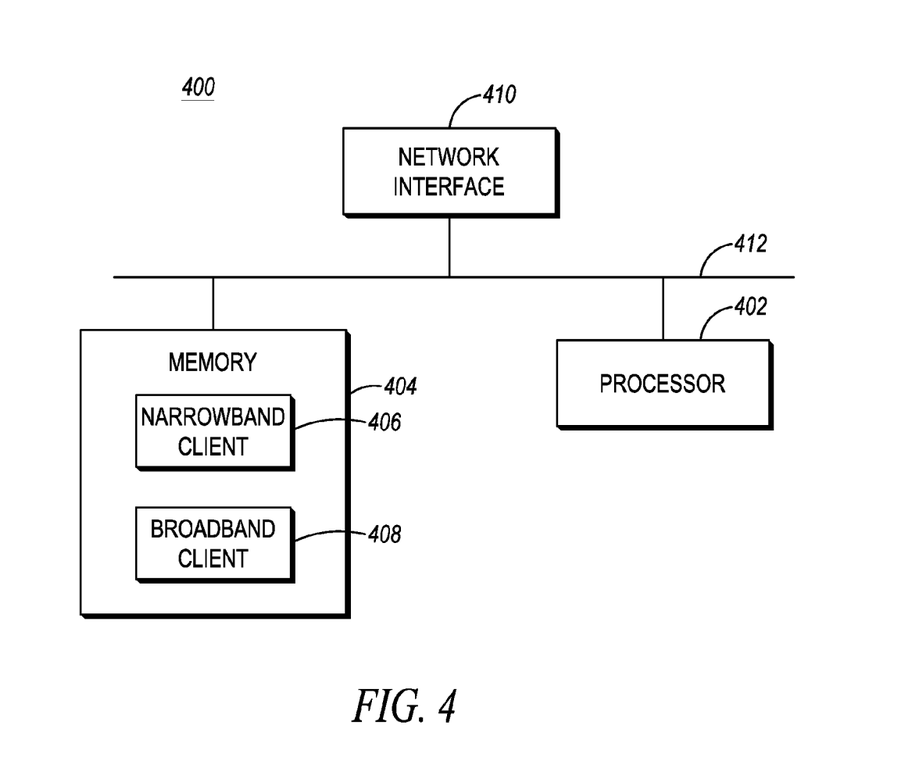
FIG. 4 is a block diagram of a Group Call Server in accordance with an embodiment of the present invention.

Referring now to FIGS. 3 and 4, block diagrams are respectively provided of a Call Controller 300, such as Call Controller 118, and a Group Call Server 400, such as Group Call Server 130, in accordance with embodiments of the present invention. Each of Call Controller 300 and Group Call Server 400 includes a respective processor 302, 402, such as one or more microprocessors, microcontrollers, digital signal processors (DSPs), combinations thereof or such other devices known to those having ordinary skill in the art. Each of Call Controller 300 and Group Call Server 400 further includes at least one memory device 304, 404, such as random access memory (RAM), dynamic random access memory (DRAM), and/or read only memory (ROM) or equivalents thereof, that is in communication with a corresponding processor 302, 402 via a corresponding bus 312, 412. Each of at least one memory devices 304, 404 stores data and programs, such as group call programs, that may be executed by the respective processor 302, 402 and that allows the Call Controller and Group Call Server to perform all functions necessary to operate in communication system 100. At least one memory device 404 further maintains a narrowband client 406 and a broadband client 408 that, when executed by processor 402, facilitates a peer-to-peer exchange of signaling and traffic with a corresponding narrowband client 206 and broadband client 208 of a mobile device. Each of Call Controller 300 and Group Call Server 400 further includes a respective network interface 310, 410 that is in communication with the corresponding processor 302, 402 via the corresponding bus 312, 412 and that provides for interfacing with other infrastructure elements of communication system 100.

In order to better insure that a public safety officer has communications service when a primary communication system serving the public safety officer cannot service a PTT request, for example, due to congestion or any other reason for a lack of resources, communication system 100 provides for the primary communications network to arrange with a secondary communications network available to the public safety officer for a set up of the call. Further, communication system 100 enables all other participants in the PTT call to see, as a talker identifier, the primary communications network user identifier of the public safety officer who keyed up the call. In one embodiment, the PTT call may be an inter-network call. In another embodiment, the PTT call may be, or include, a unit-to-unit call as well.

Figure 5:
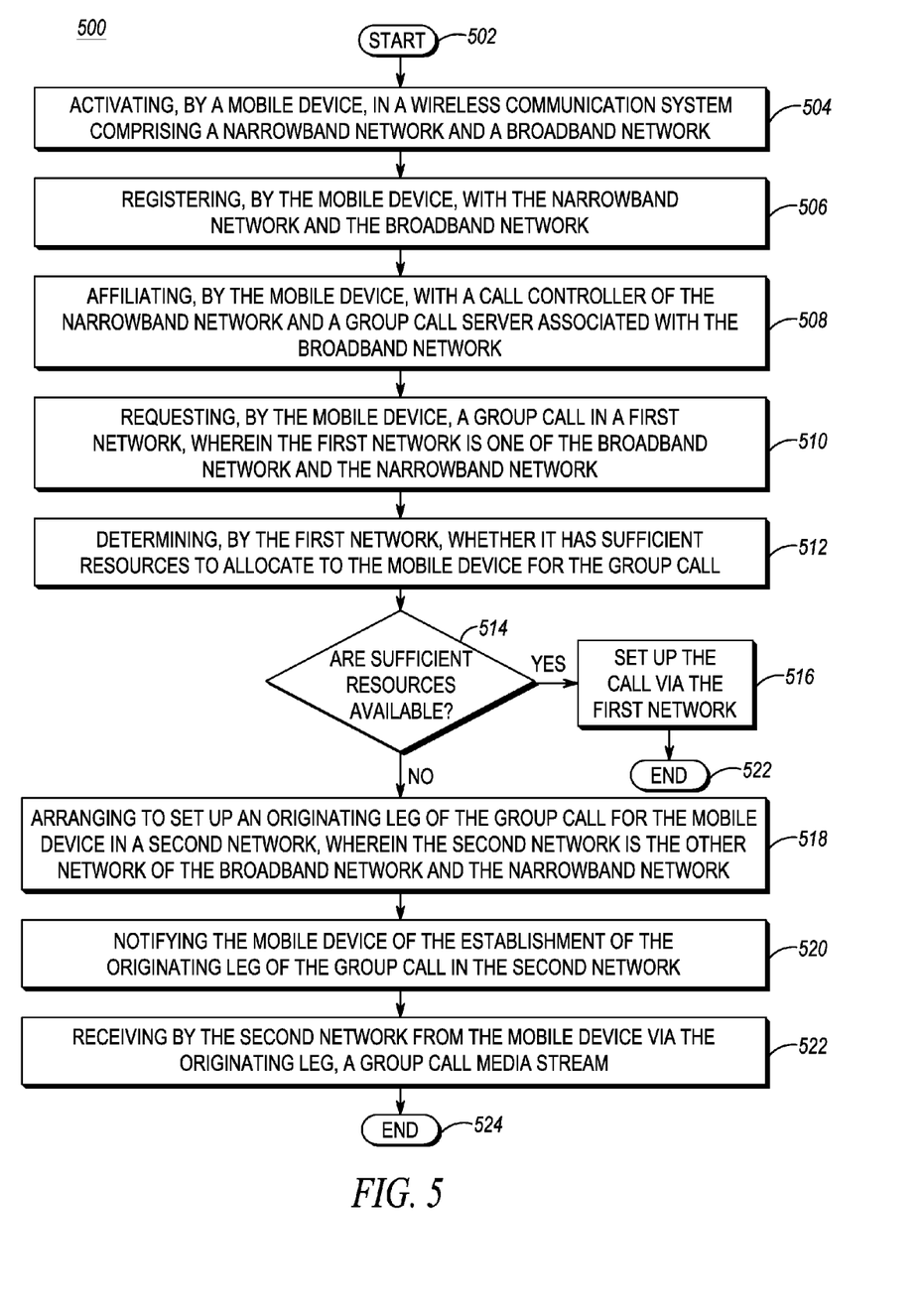
FIG. 5 is a logic flow diagram illustrating a method executed by the wireless communication system of FIG. 1 in establishing a group call for an originating mobile device in accordance with various embodiments of the present invention.

Referring now to FIG. 5, a logic flow diagram 500 is provided that illustrates an establishment of a group call for an originating mobile device by communication system 100 in accordance with various embodiments of the present invention, wherein an originating leg of the call is initiated with a first network, such as network 110, serving a user and is set up via a second network, such as network 120, serving the user. Logic flow diagram 500 begins (502) when mobile device 104 activates (504) in communication system 100 and registers (506) with each of narrowband network 110 and broadband network 120. For example, the mobile device may power up in coverage areas of each of narrowband network 110 and broadband network 120 or may roam into the coverage area of the narrowband and broadband networks.

As part of the process of registering with each of narrowband network 110 and broadband network 120, mobile device 104 affiliates (508) with Call Controller 118 and with Group Call Server 130. As part of affiliating with the Call Controller, mobile device 104 provides affiliation information to Call Controller 118, such as an identifier of the mobile device in narrowband network 110, such as a narrowband network mobile device ID. Mobile device 104 further provides information concerning any talkgroups with which the mobile device is associated, such as a talkgroup ID. In response to receiving the affiliation information (including the mobile device and talk group identifiers), Call Controller 118 compiles the affiliation information into a table maintained by the at least one memory device 304 of the Call Controller. Mobile device 104 similarly affiliates with Group Call Server 130 using the broadband network mobile device ID, including providing information concerning any talkgroups with which the mobile device is associated, such as a talkgroup ID, and in response to receiving the affiliation information (including the mobile device and talk group identifiers) the Group Call Server compiles the affiliation information into a table maintained by the at least one memory device 404 of the Group Call Server. It is assumed herein that each of Call Controller 118 and Group Call Server 130 is pre-configured (in their respective at least one memory devices) with both the narrowband network and broadband network identifiers of mobile device 104. Thus, each of Call Controller 118 and Group Call Server 130 is able to identify the mobile device to the other network 120, 110, respectively, and more specifically to Group Call Server 130 and to Call Controller 118, respectively.

At some point in time after activating in communication system 100, user 102, and more particularly mobile device 104, requests (510) to originate a group call in a first network, wherein the first network is one of narrowband network 110 and broadband network 120. For example, mobile device 104 may convey to the first network, for example, narrowband network 110, a first group call request, such as a session invitation. As part of the group call request, user 102, that is, mobile device 104, identifies to the first network one or more participants in the group call, for example, by sending the talkgroup ID and/or a list of identifiers of mobile devices (also referred to herein as target mobile devices) that the user/mobile device would like to invite to participate in the group call.

In response to receiving the request, the first network, and in particular Call Controller 118 with respect to narrowband network 110 or Group Call Server 130 with respect to broadband network 120, determines (512) whether there are sufficient network resources available (for example, channels in air interface 106 with respect to narrowband network 110 or channels in air interface 108 with respect to broadband network 120) for allocation to originating mobile device 104 for the group call. If the first network, that is, Call Controller 118 or Group Call Server 130, whichever is appropriate, determines that sufficient network resources are available (514) in the first network, then the Call Controller/Group Call Server proceeds to set up (516) the group call via the first network and in accordance with well-known group call set up procedures, and logic flow diagram 500 ends (522).

In the prior art, if an originating network, for example, a narrowband network, determines that the narrowband network resources available for allocation to an originating mobile device are insufficient to set up the call, then the narrowband network would queue the call and return a "busy" signal to the mobile device. In contrast, in response to determining that insufficient network resources are available (514) for allocation to mobile device 104 to set up the call, the first network, that is, Call Controller 118 with respect to narrowband network 110 or Group Call Server 130 with respect to broadband network 120, arranges (518) to set up an originating leg of the group call, that is, a leg of the call with originating mobile device 104, via a second network, wherein the second network is the other network of narrowband network 110 and broadband network 120. In response to establishing the originating call leg between mobile device 104 and the second network for example, broadband network 120, via a corresponding air interface, that is, air interface 108 with respect to broadband network 120, the second network, via the air interface of the second network, that is, air interface 108 with respect to broadband network 120, notifies (520) mobile device 104 that the group call has been set up, for example, by conveying a floor grant to the mobile device. In response to being informed of the set up of the group call, mobile device 104 conveys (522) to the second network, such as to Group Call Server 130 via air interface 108, access node 122, and core network 124, when the second network is broadband network 120 or to Call Controller 118 via air interface 106, access node 112, and core network 114, when the second network is narrowband network 110, and the Group Call Server/Call Controller receives from the mobile device, a media stream for the group call, and logic flow 500 then ends (524).

In various embodiments of the present invention, narrowband network 110 may arrange to set up the originating call leg via broadband network 120 by performing one or more of the following steps. Call Controller 118 conveys, to Group Call Server 130, a second group call request, which may or may not be the same as the first group call request received from mobile device 104. For example, in one embodiment of the present invention, Call Controller 118 may encapsulate the first group call request, received from mobile device 104, in an ISSI message and convey the ISSI message to Group Call Server 130 via interface 132. In other embodiments of the present invention, Call Controller 118 may assemble, and convey to Group Call Server 130 via interface 132, an ISSI INVITE, a Real Time Protocol (RTP) message, or a Real-time Control Protocol (RTCP) message. The request sent by Call Controller 118 to Group Call Server 130 includes an identifier of the mobile device originating the group call, that is, mobile device 104, and an identifier of the talkgroup and/or a list of identifiers of mobile devices invited to participate in the group call. The request further includes an indication that broadband network 120 is to be used to notify user 102 when the call is set up and to provide a grant of the floor of the group call to the user/mobile device 104.

In response to receiving the second group call request from Call Controller 118 and based on the identifier of mobile device 104, Group Call Server 130 determines whether it is serving mobile device 104 and/or user 102. When Group Call Server 130 determines that it is serving mobile device 104 and/or user 102, then the Group Call Server joins the group call as if the Group Call Server were another participant in the group call. Additionally, Group Call Server 130 determines whether any of the invited participants (that is, the target mobile devices) are served by the Group Call Server and, if so, sends group call session invites to any such participants. Further, Group Call Server 130 sets up an originating leg of the group call with originating mobile device 104 via broadband network 120. Broadband network 120 then conveys to mobile device 104, and the mobile device receives from the broadband network, a broadband network floor control message, such as a grant of the floor of the communication session (for example, a talk permit tone (TPT)). In one such embodiment of the present invention, the broadband network TPT may be the same as a narrowband network TPT; however, in another embodiment of the present invention, a broadband network TPT may be different from a narrowband network TPT so that the TPT serves to notify user 102 that the group call has been set up via broadband network 120.

In other embodiments of the present invention, broadband network 110 may arrange to set up the originating call leg via narrowband network 110 by performing one or more of the following steps. Group Call Server 130 conveys to Call Controller 118 a second group call request, which may or may not be the same as the first group call request received from mobile device 104. For example, in one embodiment of the present invention, Group Call Server 130 may encapsulate the first group call request, received from mobile device 104, in an ISSI message and convey the ISSI message to Call Controller 118 via interface 132. In other embodiments of the present invention, Group Call Server 130 may assemble, and convey to Call Controller 118 via interface 132, an ISSI INVITE, a Real Time Protocol (RTP) message, or a Real-time Control Protocol (RTCP) message. The request sent by Group Call Server 130 to Call Controller 118 includes an identifier of the mobile device originating the group call, that is, mobile device 104, and an identifier of the talkgroup and/or a list of identifiers of mobile devices invited to participate in the group call. The request further includes an indication that narrowband network 110 is to be used to notify user 102 when the call is set up and to provide a grant of the floor of the group call to the user/mobile device 104.

In response to receiving the second group call request from Group Call Server 130 and based on the identifier of mobile device 104, Call Controller 118 determines whether it is serving mobile device 104 and/or user 102. When Call Controller 118 determines that it is serving mobile device 104 and/or user 102, then the Call Controller joins the group call as if the Call Controller were another participant in the group call. Additionally, Call Controller 118 determines whether any of the invited participants (that is, the target mobile devices) are served by the Call Controller and, if so, sends group call session invites to any such participants. Further, Call Controller 118 sets up an originating leg of the group call with originating mobile device 104 via narrowband network 110. Narrowband network 110 then conveys to mobile device 104, and the mobile device receives from the narrowband network, a narrowband network floor control message, such as a grant of the floor of the communication session (for example, a talk permit tone (TPT)). In one such embodiment of the present invention, the narrowband network TPT may be the same as a broadband network TPT; however, in another embodiment of the present invention, a narrowband network TPT may be different from a broadband network TPT so that the TPT serves to notify user 102 that the group call has been set up via narrowband network 110.

Figure 6:
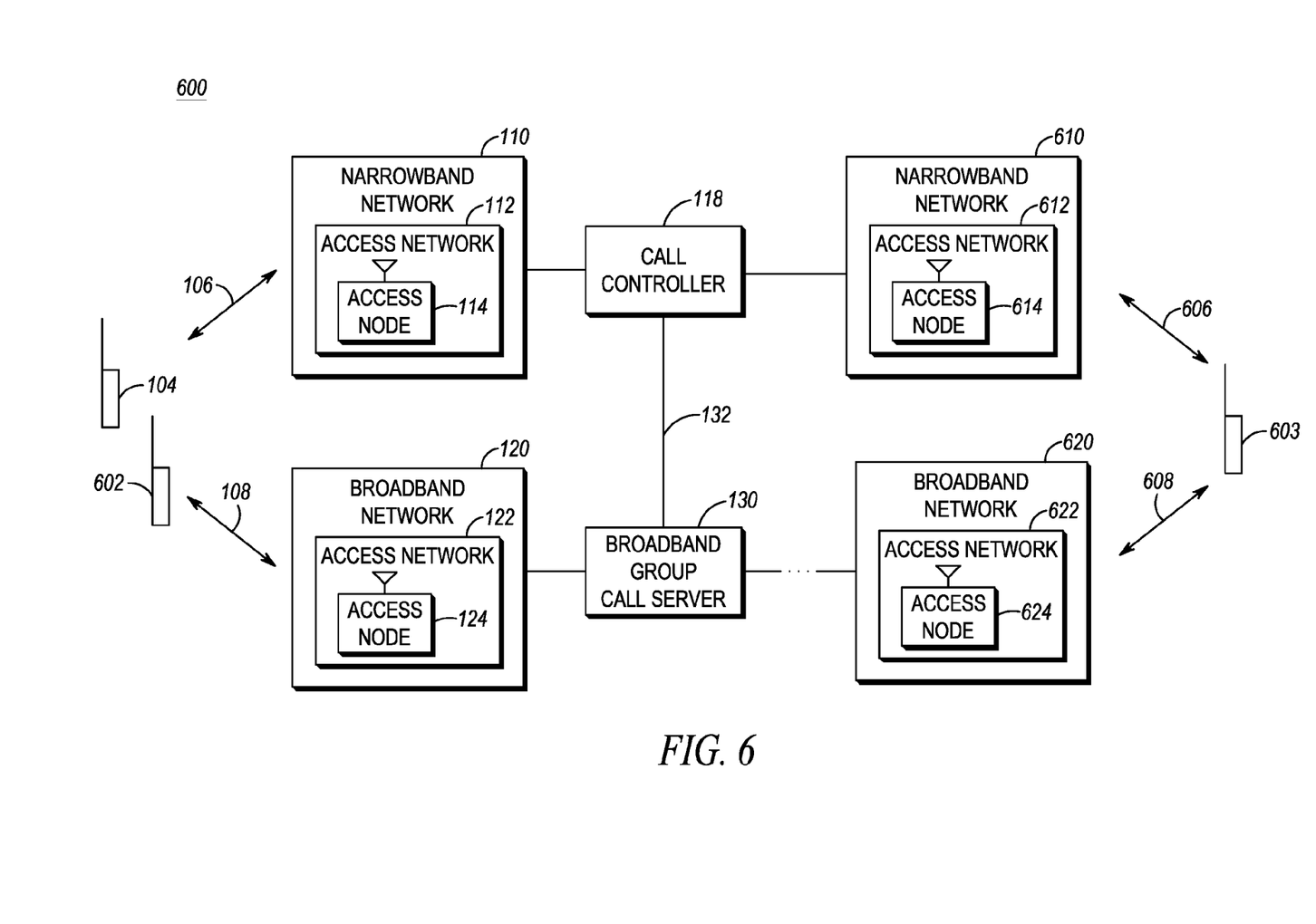
FIG. 6 is a block diagram of a wireless communication system in accordance with various embodiments of the present invention.
Figure 7A:
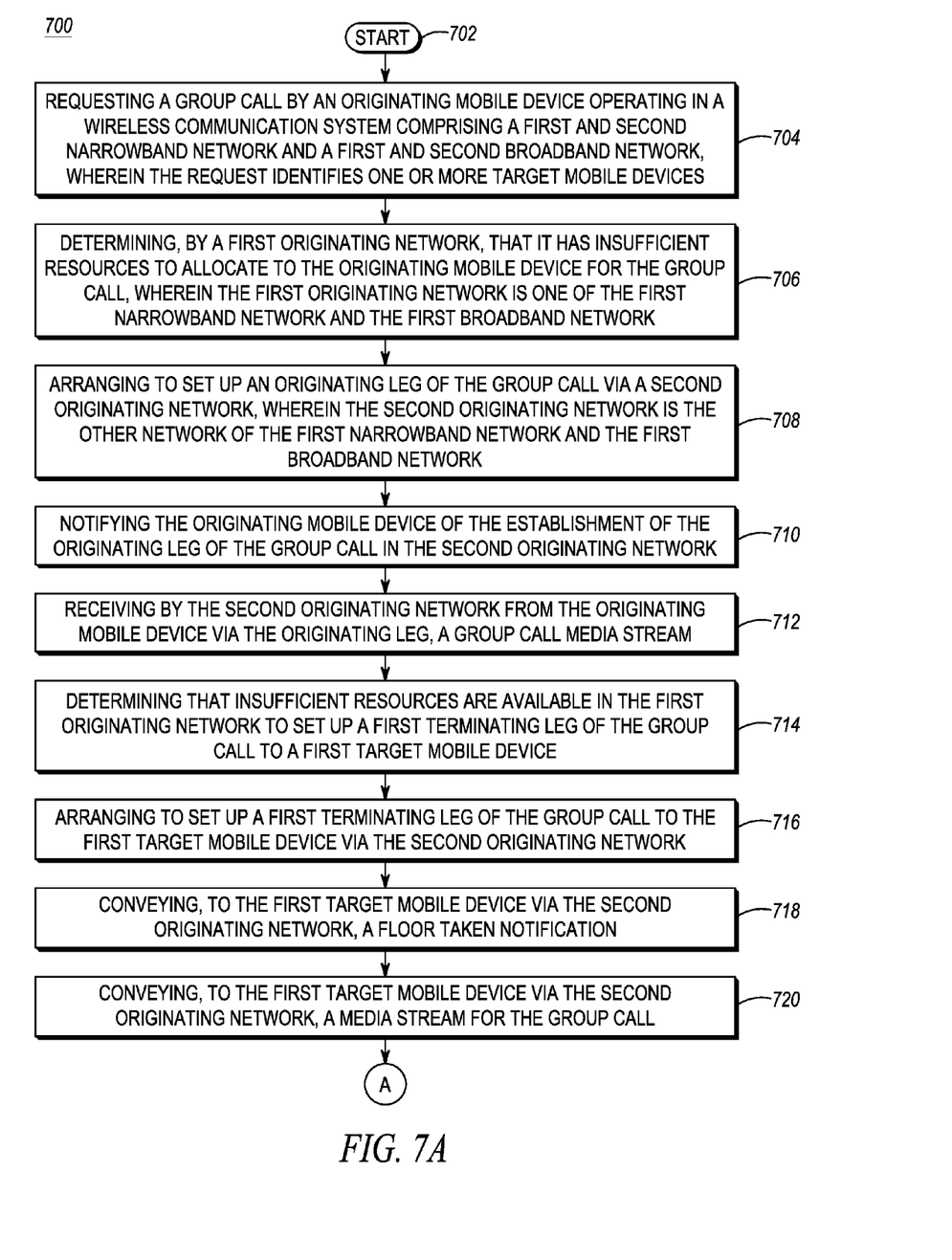
FIG. 7A is a logic flow diagram illustrating a method executed by the wireless communication system of FIG. 6 in delivering group call media streams to multiple target mobile devices in accordance with various embodiments of the present invention.
Figure 7B:
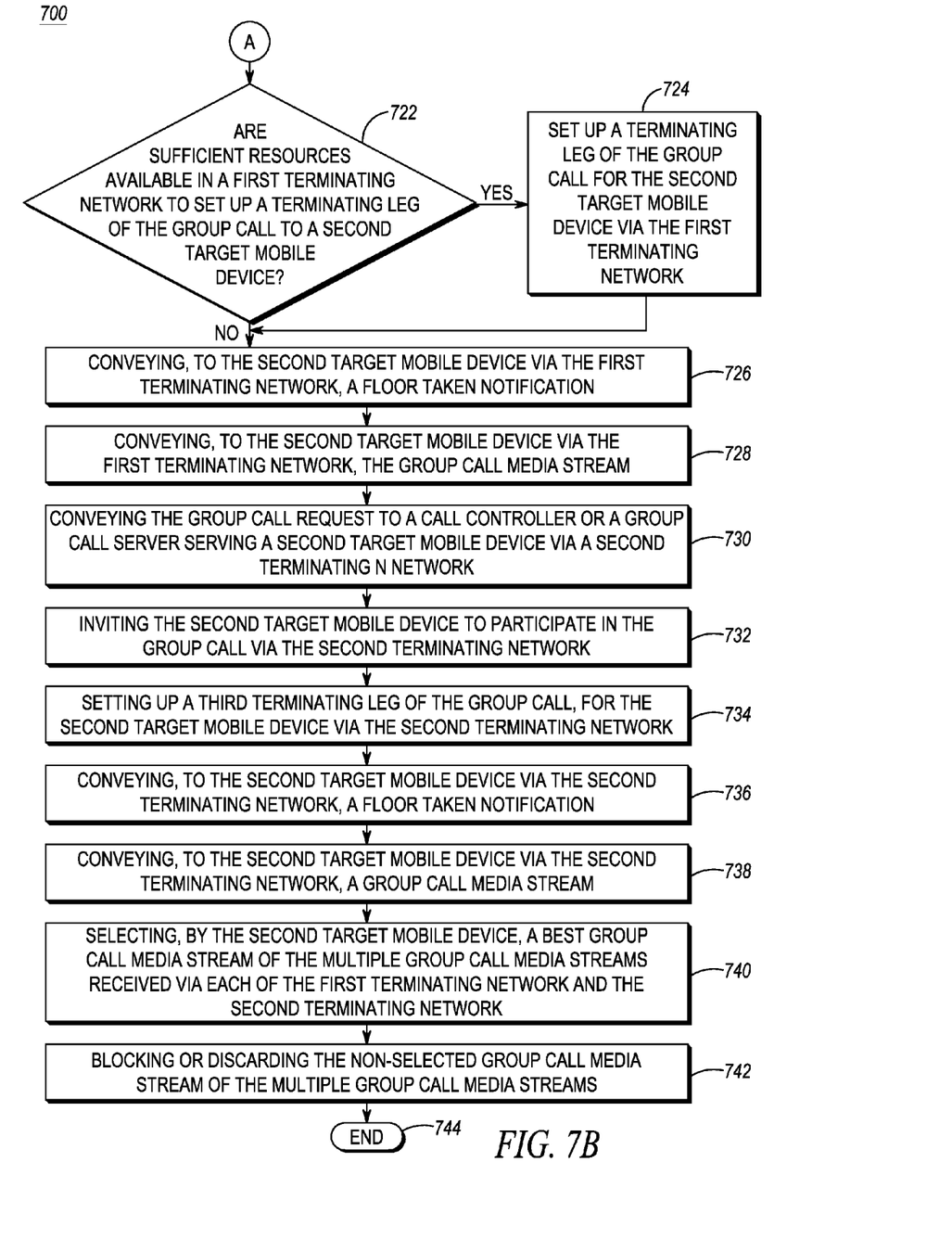
FIG. 7B is a continuation of the logic flow diagram of FIG. 7A illustrating a method executed by the wireless communication system of FIG. 6 in delivering group call media streams to multiple target mobile devices in accordance with various embodiments of the present invention.

Referring now to FIGS. 6, 7A and 7B, a method of delivering group call media streams to multiple target mobile devices in a multiple wireless technology communication system 600 is described in accordance with various embodiments of the present invention. FIG. 6 is a block diagram 600 illustrating wireless communication system 600 in accordance with various embodiments of the present invention. Wireless communication system 600 includes first narrowband network 110, comprising narrowband access network 112, and first broadband network 120, comprising broadband access network 122. Wireless communication system 600 further includes a second narrowband network 610 that includes a second narrowband access network 612, and a second broadband network 620 that includes a second broadband access network 622. Narrowband networks 110 and 610 are each coupled to Call Controller 118, and broadband networks 120 and 620 are each coupled to one or more Group Call Servers, including Group Call Server 130. Further, Call Controller 118 is coupled to the one or more Group Call Servers via inter-system interface (ISSI) 132. In various embodiments of the present invention, narrowband networks 110 and 610 may be the same or different networks, and broadband networks 120 and 620 may be the same or different networks. Further, in various embodiments of the present invention, Group Call Server 130 may serve broadband network 620, or a different group call server accessible by Group Call Server 130 may serve broadband network 620.

Narrowband access network 612 provides wireless communications services to narrowband mobile devices residing in a coverage area of narrowband access node 614 via a narrowband air interface 606 and broadband access network 622 provides wireless communications services to broadband mobile devices residing in a coverage area of broadband access node 624 via a broadband air interface 608. Each of air interfaces 606 and 608 includes an uplink and a downlink, which uplinks and downlinks each includes multiple traffic channels and multiple signaling channels.

Wireless communication system 600 further includes multiple mobile devices 104, 602, and 603 that are all members of a same talkgroup. Mobile devices 104 and 602 reside in coverage areas of, and are served by, narrowband access node 114 of narrowband access network 112 and broadband access node 124 of broadband access network 122. Mobile device 603 resides in coverage areas of, and is served by, narrowband access node 614 of narrowband access network 612 and broadband access node 624 of broadband access network 622.

Similar to mobile device 104, in one embodiment of the present invention each of the multiple mobile devices 602 and 603 may be a multi-mode communication device comprising a narrowband transceiver, which permits the mobile device to engage in communications with a narrowband network, and a broadband transceiver, which permits the mobile device to engage in communications with broadband network. In other embodiments of the present invention, one or more of mobile devices 602 and 603 may be a narrowband mobile device that may be "paired" with a corresponding broadband mobile device (not shown) to collaborate so that information sent to, or received from, one of the paired mobile devices may be based on information sent to, or received from, the other of the paired mobile devices. In such a multiple device embodiment, references herein to communications between mobile devices 602 and 603 and a narrowband network shall refer to communications between the paired narrowband mobile device and the narrowband network, and references herein to communications between the mobile devices 602 and 603 and a broadband network shall refer to communications between the paired broadband mobile device and the broadband network.

Referring now to FIGS. 7A and 7B, a logic flow diagram 700 is provided that illustrates a method executed by communication system 600 in delivering group call media streams to multiple target mobile devices in accordance with various embodiments of the present invention. Logic flow diagram 700 begins (702) when mobile device 104 requests (704) a group call via a first originating network, wherein the first originating network is one of first narrowband network 110 and Call Controller 118, and first broadband network 120 and Group Call Server 130, as described above with respect to FIG. 5. The request identifies one or more target mobile devices, that is, invitees to the group call. The request may identify the target mobile devices by, for example, providing the mobile device IDs of the target mobile devices and/or by providing a talkgroup ID, which talkgroup ID may be mapped by Call Controller 118 or Group Call Server 130 to mobile device IDs of the target mobile devices. It is assumed herein that each of Call Controller 118 and the one or more Group Call Servers is pre-configured (in their respective at least one memory devices) with both the narrowband network and broadband network identifiers of each of mobile devices 104, 602, and 603. Thus, each of Call Controller 118 and Group Call Server 130 is able to identify the mobile devices to the other networks of communication system 600, and more specifically to the one or more Group Call Servers and to the Call Controller, respectively.

For the purpose of illustrating the principles of the present invention and not intending to limit the invention in any way, the target mobile devices include mobile devices 602 and 603, which are assumed for purposes of these embodiments to be registered with each of Call Controller 118 and the one or more Group Call Servers. For example, when each of mobile devices 602 and 603 powers up in a coverage area of their respective serving networks (that is, networks 110 and 120 with respect to mobile device 602 and networks 610 and 620 with respect to mobile device 603) or roams into a coverage area of their respective serving networks, the mobile device registers with the Call Controller and/or Group Call Server serving such networks, that is, Call Controller 118 and the one or more Group Call Servers. As part of the registration process, each mobile device 602, 603 affiliates with their respective Call Controller and Group Call Server, for example, Call Controller 118 and Group Call Server 130, including providing affiliation information to Call Controller and Group Call Server, such as an identifier of the mobile device in its corresponding narrowband or narrowband network and information concerning any talkgroups with which the mobile device is associated, such as a talkgroup ID.

In response to receiving the request, the first originating network, and more particularly Call Controller 118 with respect to first narrowband network 110 or Group Call Server 130 with respect to first broadband network 120, determines (706) that insufficient resources are available in the first originating network for allocation to originating mobile device 104 to set up the group call and arranges (708) to set up an originating call leg, that is, a leg of the call with originating mobile device 104, via a second originating network, that is, the other network of first narrowband network 110 and first broadband network 120.

In response to establishing the originating call leg for mobile device 104 via the second originating network, the second originating network, via the air interface of the second originating network, notifies (710) mobile device 104 that the group call has been set up, for example, by conveying a floor grant to the mobile device. In response to being informed of the set up of the group call, mobile device 104 conveys (712) to the second originating network, such as to Group Call Server 130 when the second network is broadband network 120 or to Call Controller 118 the second originating network is narrowband network 110, and the Group Call Server/Call Controller receives from the mobile device, a media stream for the group call.

Further, Call Controller 118 or Group Call Server 130, whichever is serving the first originating network, determines (714) whether sufficient resources are available in the first originating network for allocation to a first target mobile device 602 of the multiple target mobile devices 602, 603 to set up a first terminating leg of the group call. Assuming that insufficient resources are available in the first originating network for allocation to mobile device 602, Call Controller 118 or Group Call Server 130, again whichever is serving the first originating network, arranges (716) to set up a first terminating call leg to mobile device 602 in the second originating network. Call Controller 118 or Group Call Server 130, whichever is appropriate, then conveys (718) a floor control message, such as notification that the 'floor is taken' (that is, by mobile device 104), to mobile device 602, and forwards (720) a group call media stream, for example, received from originating mobile device 104, to mobile device 602 via the second originating network, that is, via Group Call Server 130, access node 124, and air interface 108 when the second originating network is broadband network 120, and via Call Controller 118, access node 114 and air interface 106 when the second originating network is narrowband network 110.

Further, in response to receiving the request, Call Controller 118 determines (722) whether sufficient resources are available in a first terminating network, that is, one of second narrowband network 610 and second broadband network 620, for allocation to a second target mobile device 603 of the multiple target mobile devices 602, 603 to set up a second terminating leg of the group call for the mobile device. Assuming that sufficient resources are available in first terminating network, Call Controller 118 or one of the one or more Group Call Servers, whichever is serving the first terminating network, sets up (724) the second terminating leg of the group call for second target mobile device 603 via the first terminating network. The first terminating network then conveys (726), to mobile device 603, and the mobile device receives from the first terminating network, a notification that the 'floor is taken' (by mobile device 104) and forwards (728) the group call media stream received, for example, from originating mobile device 104 to the mobile device 603 via first terminating network 610, an access node of the first terminating network (that is, access node 614 with respect to narrowband network 610 or access node 624 with respect to broadband network 620), and an air interface of the first terminating network (that is, air interface 606 with respect to narrowband network 610 or air interface 608 with respect to broadband network 620).

Additionally, in response to receiving the request from mobile device 104, Call Controller 118 or one of the one or more Group Call Servers, whichever is serving the first terminating network, respectively conveys (730), the group call request to the one or more Group Call Servers or to Call Controller 118, whichever is serving a second terminating network, wherein the second terminating network is the other network (that is, as opposed to the first terminating network) of second narrowband network 610 and second broadband network 620. The request includes an identifier of second target mobile device 603, such as an identifier of the talkgroup and/or a list of identifiers of mobile devices invited to participate in the group call. In response to receiving the group call request from Call Controller 118 or the one or more Group Call Servers, and based on the talkgroup ID and/or the identifier of second target mobile device 603, the one of the one or more Group Call Servers or Call Controller 118, whichever is serving the second terminating network, determines a Group Call Server or Call Controller serving target mobile device 603 via the second terminating network and/or a user of the mobile device. For example, when the second terminating network is broadband network 620, Group Call Server 130 may determine that it is serving target mobile device 603, or in accordance with well-known group call set up techniques, Group Call Server 130 may determine another, participating Group Call Server serving target mobile device 603. In the latter event, Group Call Server 130 then establishes a group call connection with the participating Group Call Server.

The one of the one or more Group Call Servers or the Call Controller, whichever is serving the second terminating network, then invites (732) second target mobile device 603 to participate in the group call. For example, if the second terminating network is broadband network 620, then the one of the one or more Group Call Servers may convey a SIP INVITE to the mobile device via broadband network 620. The one of the one or more Group Call Servers or Call Controller 118 serving target mobile device 603 in the second terminating network then establishes (734) a third terminating leg of the group call with target mobile device 603 via the second terminating network. The second terminating network then conveys (736), to target mobile device 603, and the mobile device receives from the second terminating network, a floor control message, for example, a notification that the 'floor is taken' (by mobile device 104) and forwards (738) the group call media stream received from originating mobile device 104 to target mobile device 603 via the second terminating network, for example, via access node 624 and air interface 608 when the second terminating network is broadband network 620 and via access node 614 and air interface 606 when the second terminating network is narrowband network 610.

In response to receiving the multiple group call media streams, that is, receiving the group call media stream from each of narrowband network 610 and broadband network 620, mobile device 603 may select (740) a best group call media stream of the multiple group call media streams and block or discard (742) the other, non-selected group call media stream. Logic flow 700 then ends (744). For example, mobile device 603 may determine a signal quality metric for each group call media stream, such as a signal strength of the received stream (for example, a received signal strength indication (RSSI), a signal-to-noise ratio (SNR), a signal-to-noise plus interference ratio (SINR), a carrier-to-interference-plus-noise ratio (CINR), a bit energy-to-noise density ratio (Eb/Io), a bit error rate, or a frame error rate associated with the stream. Mobile device 603 then may select a stream with a best signal quality metric and block or discard the other, non-selected group call media stream.

The embodiments of the present invention preferably are implemented within each of mobile devices 104, 603, and 603, Call Controller 118, and Group Call Server 130, and more particularly with or in software programs and instructions stored in the at least one memory devices 204, 304, 404, 504 and executed by the processors 202, 302, 402, 502 of the mobile devices, Call Controller, and Group Call Server. However, one of ordinary skill in the art realizes that the embodiments of the present invention alternatively may be implemented in hardware, for example, integrated circuits (ICs), application specific integrated circuits (ASICs), and the like, such as ASICs implemented in one or more of mobile devices 104 and 105, Call Controller 118, and Group Call Server 130 and all references to 'means for' herein may refer to any such implementation of the present invention. Based on the present disclosure, one skilled in the art will be readily capable of producing and implementing such software and/or hardware without undo experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for implementing a group call, the method comprising:
   receiving, by an infrastructure device associated with a first originating network from a mobile device, a group call request, wherein the first originating network is one of a narrowband network and a broadband network;
   in response to receiving the group call request, determining, by the infrastructure device, that insufficient network resources are available in the first originating network for allocation to the mobile device for the group call; and
   in response to determining that insufficient network resources are available, arranging, by the infrastructure device, to set up an originating leg of the group call for the mobile device in a second originating network, wherein the second originating network is the other network of the narrowband network and the broadband network.

2. The method of claim 1, wherein the group call request is a first group call request and wherein arranging comprises:
   conveying, by the first originating network to the second originating network, a second group call request; and
   in response to receiving the second group call request, setting up, by the second originating network, the originating leg of the group call with the mobile device in the second originating network.

3. The method of claim 2, wherein the second group call request comprises an inter-system interface (ISSI) message, a Real Time Protocol (RTP) message, or a Real-time Control Protocol (RTCP) message.

4. The method of claim 1, wherein the group call request is a first group call request and wherein arranging comprises:
   conveying, by the first originating network to the second originating network, a second group call request; and
   in response to receiving the second group call request and based on the corresponding identifier of the user in the second originating network, establishing, by the second originating network, the originating leg of the group call with the mobile device in the second originating network.

5. The method of claim 1, further comprising:
   establishing the originating leg of the group call with the mobile device via the second originating network;
   notifying the mobile device, via the second originating network, of the set up of the group call;
   conveying, to the mobile device via the originating leg in the second originating network, a floor control message;
   receiving, from the mobile device via the originating leg in the second originating network, a group call media stream.

6. The method of claim 1, wherein the group call request identifies a target mobile device and wherein the method further comprises:
   determining, by the infrastructure device, that insufficient network resources are available in the first originating network for allocation to the target mobile device for group call; and
   in response to determining that insufficient network resources are available in the first originating network for allocation to the target mobile device, arranging, by the infrastructure device, to set up a terminating leg of the group call for the target mobile device in the second originating network.

7. The method of claim 6, further comprising:
   establishing the terminating leg of the group call with the target mobile device via the second originating network;
   conveying, to the target mobile device via the terminating leg in the second originating network, a floor control message;
   conveying, to the target mobile device via the terminating leg in the second originating network, a group call media stream.

8. The method of claim 1, wherein the narrowband network is a first narrowband network and the broadband network is a first broadband network, wherein the first group call request identifies a target mobile device, and wherein the method further comprises:
  establishing terminating legs of the group call with the target mobile device in each of a second narrowband network and a second broadband network;
  conveying, to the target mobile device via the terminating legs in each of the second narrowband network and the second broadband network, a group call media stream.

9. The method of claim 8, further comprising:
  receiving, by the target mobile device, a plurality of group call media streams, wherein the plurality of group call media streams comprise the group call media stream received via the terminating leg in the second narrowband network and the group call media stream received via the terminating leg in the second broadband network;
  selecting, by the target mobile device, a group call media stream of the plurality of group call media streams; and
  blocking or discarding, by the target mobile device, a non-selected group call media stream of the plurality of group call media streams.

10. An apparatus for implementing a group call in a wireless communication system comprising a narrowband network and a broadband network, the apparatus comprising:
  an infrastructure device comprising:
    an interface;
    a processor; and
    an at least one memory device that is configured to store a set of instructions that, when executed by the processor, cause the processor to perform the following functions:
      receive, via the interface and from a mobile device, a group call request;
      in response to receiving the group call request, determine that insufficient network resources are available in a first originating network for allocation to the mobile device for the group call, wherein the first originating network is one of the narrowband network and the broadband network; and
      in response to determining that insufficient network resources are available in the first originating network, arrange to set up an originating leg of the group call for the mobile device in a second originating network, wherein the second originating network is the other network of the of the narrowband network and the broadband network.

11. The apparatus of claim 10, wherein the group call request is a first group call request, wherein the infrastructure device is a first infrastructure device associated with the first originating network, and wherein the apparatus further comprises a second infrastructure device associated with the second originating network,
  wherein the first infrastructure device is configured to arrange to set up an originating leg by conveying to the second infrastructure device a second group call request, and
  wherein the second infrastructure device is configured to, in response to receiving the second group call request, set up the originating leg of the group call with the mobile device in the second originating network.

12. The apparatus of claim 11, wherein the second group call request comprises an inter-system interface (ISSI) message, a Real Time Protocol (RTP) message, or a Real-time Control Protocol (RTCP) message.

13. The apparatus of claim 10, wherein the group call request is a first group call request, wherein the infrastructure device is a first infrastructure device associated with the first originating network, and wherein the apparatus further comprises a second infrastructure device associated with the second originating network,
  wherein the first infrastructure device is configured to convey, to the second infrastructure device, a second group call request, and
  wherein the second infrastructure device is configured to, in response to receiving the second group call request and based on a corresponding identifier of the user in the second originating network, set up the originating leg of the group call with the mobile device in the second originating network.

14. The apparatus of claim 10, wherein the infrastructure device is a first infrastructure device associated with the first originating network, wherein the apparatus further comprises a second infrastructure device associated with the second originating network and that is configured to:
  establish the originating leg of the group call with the mobile device via the second originating network;
  notify the mobile device, via the second originating network, of the set up of the group call;
  convey, to the mobile device via the originating leg in the second originating network, a floor control message;
  receiving a group call media stream from the mobile device via the originating leg in the second originating network.

15. The apparatus of claim 10, wherein the group call request identifies a target mobile device and wherein the at least one memory device is configured to store a set of instructions that, when executed by the processor, cause the processor to:
  determine that insufficient network resources are available in the first originating network for allocation to the target mobile device for group call; and
  in response to determining that insufficient network resources are available in the first originating network for allocation to the target mobile device, arrange to set up a terminating leg of the group call for the target mobile device in the second originating network.

16. The apparatus of claim 15, wherein the group call request is a first group call request, wherein the infrastructure device is a first infrastructure device associated with the first originating network, and wherein the apparatus further comprises a second infrastructure device associated with the second originating network and that is configured to:
  receive a second group call request from the first infrastructure device, wherein the second group call request identifies the target mobile device;
  establish the terminating leg of the group call with the target mobile device via the second originating network;
  convey, to the target mobile device via the terminating leg in the second originating network, a floor control message;
  conveying, to the target mobile device via the terminating leg in the second originating network, a group call media stream.

17. A system for implementing a group call in a wireless communication system comprising a plurality of narrowband networks and a plurality of broadband networks, the system comprising:
  a narrowband network infrastructure device that is configured to:
    receive, from an originating mobile device, a first group call request that identifies a target mobile device;
    in response to receiving the first group call request, determine that insufficient resources of a first narrowband network of the plurality of narrowband networks are available for allocation to the mobile device for the group call; and in response to determining that insufficient narrowband network resources are available, convey a second group call request to a broadband Group Call Server;

one or more broadband Group Call Servers that are configured to:

receive the second group call request;

establish an originating leg of the group call with the originating mobile device in a first broadband network of the plurality of broadband networks;

establish a terminating leg of the group call with the target mobile device in a second broadband network of the plurality of broadband networks; and wherein the narrowband network infrastructure device further is configured to establish a terminating leg of the group call with the target mobile device in a second narrowband network of the plurality of narrowband networks.

18. The system of claim 17, further comprising the target mobile device and wherein the target mobile is configured to:

receiving a plurality of group call media streams, wherein the plurality of group call media streams comprise a group call media stream received via the terminating leg in the second narrowband network and a group call media stream received via the terminating leg in the second broadband network;

select a group call media stream of the plurality of group call media streams; and block or discard a non-selected group call media stream of the plurality of group call media streams.

19. A system for implementing a group call in a wireless communication system comprising a plurality of narrowband networks and a plurality of broadband networks, the system comprising:

one or more broadband Group Call Servers that are configured to:

receive, from an originating mobile device, a first group call request that identifies a target mobile device;

in response to receiving the first group call request, determine that insufficient resources of a first broadband network of the plurality of broadband networks are available for allocation to the mobile device for the group call; and in response to determining that insufficient broadband network resources are available, convey a second group call request to a narrowband network infrastructure device;

the narrowband network infrastructure device, wherein the narrowband network infrastructure device is configured to:

receive the second group call request;

establish an originating leg of the group call with the originating mobile device in a first narrowband network of the plurality of narrowband networks;

establish a terminating leg of the group call with the target mobile device in a second narrowband network of the plurality of narrowband networks; and wherein the one or more broadband Group Call Servers further are configured to establish a terminating leg of the group call with the target mobile device in a second broadband network of the plurality of broadband networks.

* * * * *